(12) United States Patent
Yu

(10) Patent No.: US 7,561,111 B2
(45) Date of Patent: Jul. 14, 2009

(54) MODULIZED ANTENNA STRUCTURE

(75) Inventor: Jen-Huan Yu, Taipei (TW)

(73) Assignee: Compal Electronics, Inc., Taipei (TW)

( * ) Notice: Subject to any disclaimer, the term of this patent is extended or adjusted under 35 U.S.C. 154(b) by 233 days.

(21) Appl. No.: 11/724,132

(22) Filed: Mar. 14, 2007

(65) Prior Publication Data

US 2007/0285317 A1  Dec. 13, 2007

(30) Foreign Application Priority Data

Jun. 13, 2006 (TW) ............................... 95120936 A

(51) Int. Cl.
  *H01Q 1/24* (2006.01)
(52) U.S. Cl. ................. 343/702; 343/700 MS
(58) Field of Classification Search .......... 343/700 MS, 343/702, 846
  See application file for complete search history.

(56) References Cited

U.S. PATENT DOCUMENTS 5,990,838 A * 11/1999 Burns et al. ................. 343/702
6,683,574 B2 * 1/2004 Su ....................... 343/700 MS
6,836,247 B2 * 12/2004 Soutiaguine et al. .. 343/700 MS
7,202,826 B2 * 4/2007 Grant et al. ................. 343/713

* cited by examiner

*Primary Examiner*—Tan Ho
(74) *Attorney, Agent, or Firm*—Ming Chow; Sinorica, LLC

(57) ABSTRACT

The present invention relates to a modulized antenna structure, which comprises: a first antenna module for receiving a first transmission signal in which at least one side of the first antenna module has a first opening; a second antenna module for receiving a second transmission signal in which at least one side of the second antenna module has a second opening; and a fixed component, while being assembled, with the fixed component, the first antenna module is partially overlapped with the second antenna modules and the first opening is fully overlapped with the second opening, thus the fixed component can pass through the first and second openings and be fixed on the screen of an electronic device.

27 Claims, 5 Drawing Sheets

MODULIZED ANTENNA STRUCTURE

BACKGROUND OF THE INVENTION

1. Field of the Invention

The present invention relates to a modulized antenna structure, and more particularly, to a modulized antenna structure in which two different antenna modules are partially overlapped, such that the antenna structure is smaller and easier to assemble.

2. Description of the Related Art

For adapting to the prevalence of the Digital Video Broadcast (DVB), Global Positioning System (GPS) or Wireless Fidelity (Wi-Fi) wireless local area networks, it is common to add one antenna module on the notebook computers to receive the aforementioned DVB, GPS or Wi-Fi's wireless signals.

For example, an integrated multi-frequency antenna for notebook computers had been disclosed by the "Integrated Multi-frequency Antenna for Notebook Computers" in the approved R.O.C. Patent No. 583785 (applied on Apr. 8, 2003 and published on Apr. 11, 2004). Here, the notebook computer comprises a screen and a screen case frame, and the integrated multi-frequency antenna is disposed on the screen case frame. In addition, the integrated multi-frequency antenna comprises: a first radiation metal line for generating a first resonant state; a second radiation metal line that is opposite to and is disposed a certain distance from the first radiation metal line for generating a second resonant state; a grounded metal piece that is opposite to and is disposed a certain distance from the second radiation metal line; at least a first connection metal line for connecting the first radiation metal line and the second radiation metal line; and a second connection metal line for connecting the second radiation metal line and the grounded metal piece. As revealed in the patent's drawings, the antenna module is installed on the top of the notebook computer's screen with the openings on its both sides. The patent mainly focuses on the structure of the integrated multi-frequency antenna on the notebook computers. It is obvious from the drawings that the multi-frequency antenna module can also be fixed on the notebook computer's screen to receive the signals by using the screws. In the method mentioned above, two screws are required to pass through two openings on both sides to fix the antenna module. If more than one multi-frequency antenna module is required, more screws are needed. Accordingly, it is rather time consuming to assemble the antenna module mentioned above.

SUMMARY OF THE INVENTION

Therefore, it is an objective of the present invention to provide a modulized antenna structure, in which the desired antenna modules and the antenna's position can be flexibly configured on the modulized antenna structure based on the product's requirements.

It is another objective of the present invention to provide a modulized antenna structure that effectively constraints the position of the antenna module to improve the antenna's receiving effectiveness and facilitate the antenna's assembly, so as to reduce the manufacturing cost.

To achieve the foregoing objectives, the present invention provides a modulized antenna structure, which comprises: a first antenna module for receiving a first transmission signal in which at least one side of the first antenna module has a first opening; a second antenna module for receiving a second transmission signal in which at least one side of the second antenna module has a second opening; and a fixed component, while being assembled, with the fixed component, the first antenna module is partially overlapped with the second antenna modules and the first opening is fully overlapped with the second opening, thus the fixed component can pass through the first and second openings and be fixed on the screen of an electronic device.

To achieve the foregoing objectives, the present invention provides a modulized antenna structure, which comprises a first antenna module for receiving a first transmission signal and a second antenna module for receiving a second transmission signal. Wherein, the first antenna module is partially overlapped with the second antenna module to form a protruding wall. While being assembled, the partially overlapped first and second antenna modules can be fixed on an electronic device.

BRIEF DESCRIPTION DRAWINGS

The accompanying drawings are included to provide a further understanding of the invention, and are incorporated in and constitute a portion of this specification. The drawings illustrate embodiments of the invention, and together with the description, serve to explain the principles of the invention.

FIG. 1(*b*) is a schematic diagram showing a second antenna module of a modulized antenna structure according to a preferred embodiment of the present invention.

DESCRIPTION PREFERRED EMBODIMENTS

Figure 1A:
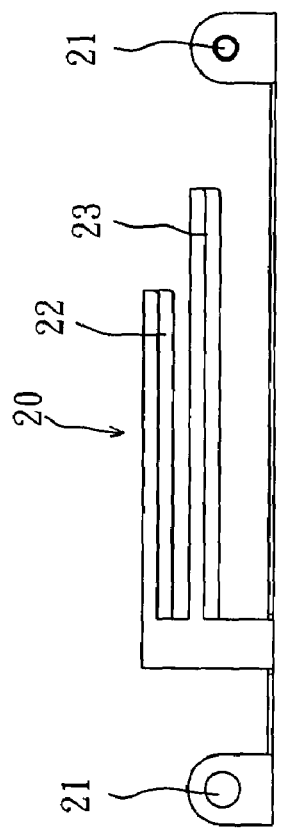
FIG. 1(*a*) is a schematic diagram showing a first antenna module of a modulized antenna structure according to a preferred embodiment of the present invention.
Figure 1B:
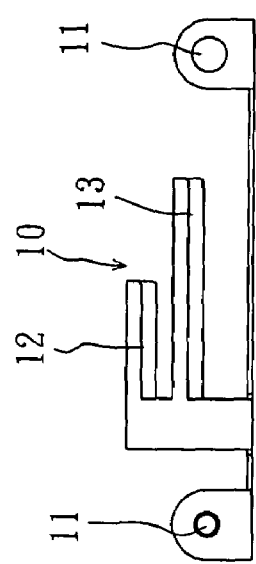
Figure 2:
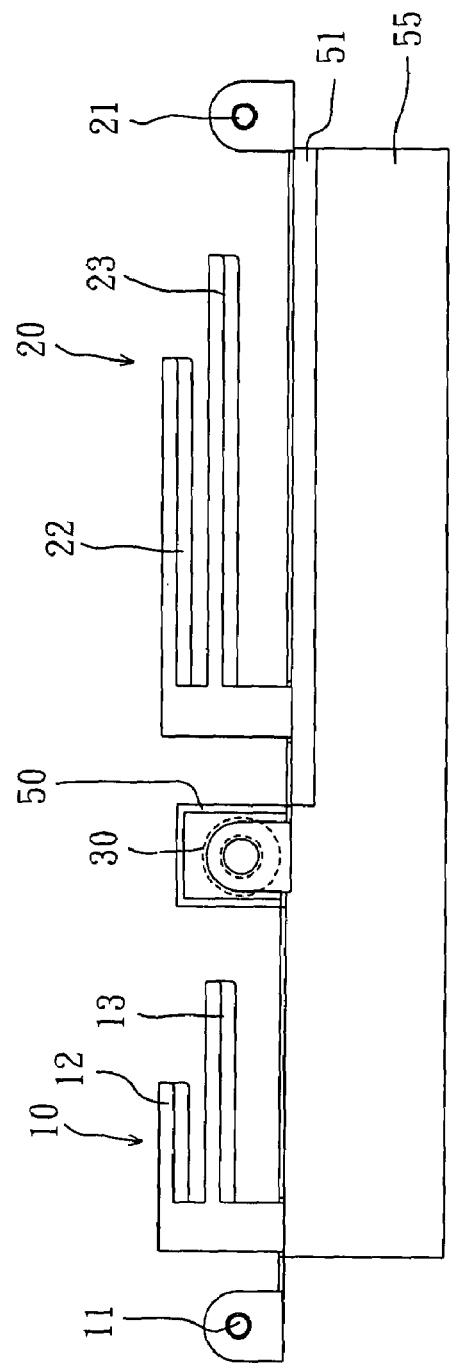
FIG. 2 is a schematic diagram showing the overlapping of the first antenna module and the second antenna module of the present invention while they are being assembled.

Referring to FIGS. 1(*a*), 1(*b*) and 2, wherein FIG. 1(*a*) schematically shows a first antenna module of a modulized antenna structure according to a preferred embodiment of the present invention; FIG. 1(*b*) schematically shows a second antenna module of a modulized antenna structure according to a preferred embodiment of the present invention; and FIG. 2 is a schematic diagram showing the overlapping of the first antenna module and the second antenna module of the present invention while they are being assembled. As shown in the drawings, the modulized antenna structure of the present invention comprises a first antenna module 10, a second antenna module 20, and a fixed component 30.

Wherein, the first antenna module 10 receives a first transmission signal in which at least one side of the first antenna module 10 has a first opening 11. Two openings 11 are exemplified in the present embodiment for easy explanation, but it is not limited to two openings. Here, the first antenna module 10 is for example a Wi-Fi antenna module to receive a Wi-Fi wireless signal, but it is not limited to it.

The first antenna module 10 further comprises a first antenna 12 and a second antenna 13. Wherein, the first antenna 12 is shorter than the second antenna 13 and disposed in front of the second antenna 13. The first antenna 12 for example may transmit or receive a 5 GHz wireless signal, but it is not limited to it. The second antenna 13 for example may transmit or receive a 2.4 GHz wireless signal, but it is not limited to it.

The second antenna module 20 receives a second transmission signal in which at least one side of the second antenna module 20 has a second opening 21. Two openings 21 are exemplified in the present embodiment for easy explanation, but it is not limited to two openings. Here, the second antenna module 20 is for example, a DVB antenna module, a GPS antenna module or a 3G antenna module for receiving a DVB, a GPS or a 3G wireless signal, but it is not limited to it.

The second antenna module 20 further comprises a first antenna 22 and a second antenna 23. Wherein, the first antenna 22 is shorter than the second antenna 23 and disposed in front of the second antenna 23. The first antenna 22 for example may transmit or receive an 1800~2170 MHz Wi-Fi wireless signal, but it is not limited to it. The second antenna 23 for example may transmit or receive an 800~1000 MHz Wi-Fi wireless signal, but it is not limited to it.

The fixed component 30 is used to secure the first antenna module 10 and the second antenna module 20. The fixed component 30 is for example a screw, a bolt or a pin, but it is not limited to it. The screw is exemplified in the present embodiment for easy explanation, but it is not limited to it.

As shown in FIG. 2, while being assembled, the first antenna module 10 is partially overlapped with the second antenna module 20, such that the first opening 11 on the right side of the first antenna module 10 is fully overlapped on the second opening 21 on the left side of the second antenna module 20. Afterwards, the fixed component 30 passes through the first opening 11 and the second opening 21 and fixes on the top of the screen 41 of an electronic device 40. The fixed component 30 for example is fixed on the top left or top right of the screen 41 of the electronic device 40, but it is not limited to it. Wherein, the electronic device may for example be a notebook computer, a Personal Digital Assistant (PDA) or an intelligent mobile phone, but it is not limited to them. Here, the overlapped portion of the first antenna module 10 and the second antenna module 20 is less than 1 cm. In addition, the first antenna module 10 is disposed closer to one side of the screen 41 of the electronic device 40 than the second antenna module 20, such that the electronic device 40 can maintain a good signal receiving state.

In addition, the modulized antenna structure of the present invention further comprises a grounded wall 50 and a metal wall 51. Wherein, the grounded wall 50 is made of metal material and disposed on the overlapped first opening 11 and second opening 21, so as to improve the grounded function and to prevent the interference from being generated between the first antenna module 10 and the second antenna module 20. The metal wall 51 is disposed below the second antenna module 20 and one end of the metal wall 51 is coupled to the grounded wall 50 for covering the second antenna module 20, such that the interference generated between the first antenna module 10 and the second antenna module 20 is avoided.

In addition, the modulized antenna structure of the present invention further comprises a grounded metal stick board 55, on which one surface is respectively coupled to the first antenna module 10 and the second antenna module 20 in order to provide the grounded function, and another surface is affixed on the electronic device 40, so as to enhance the fixed effectiveness of the first antenna module 10 and the second antenna module 20.

Figure 3:
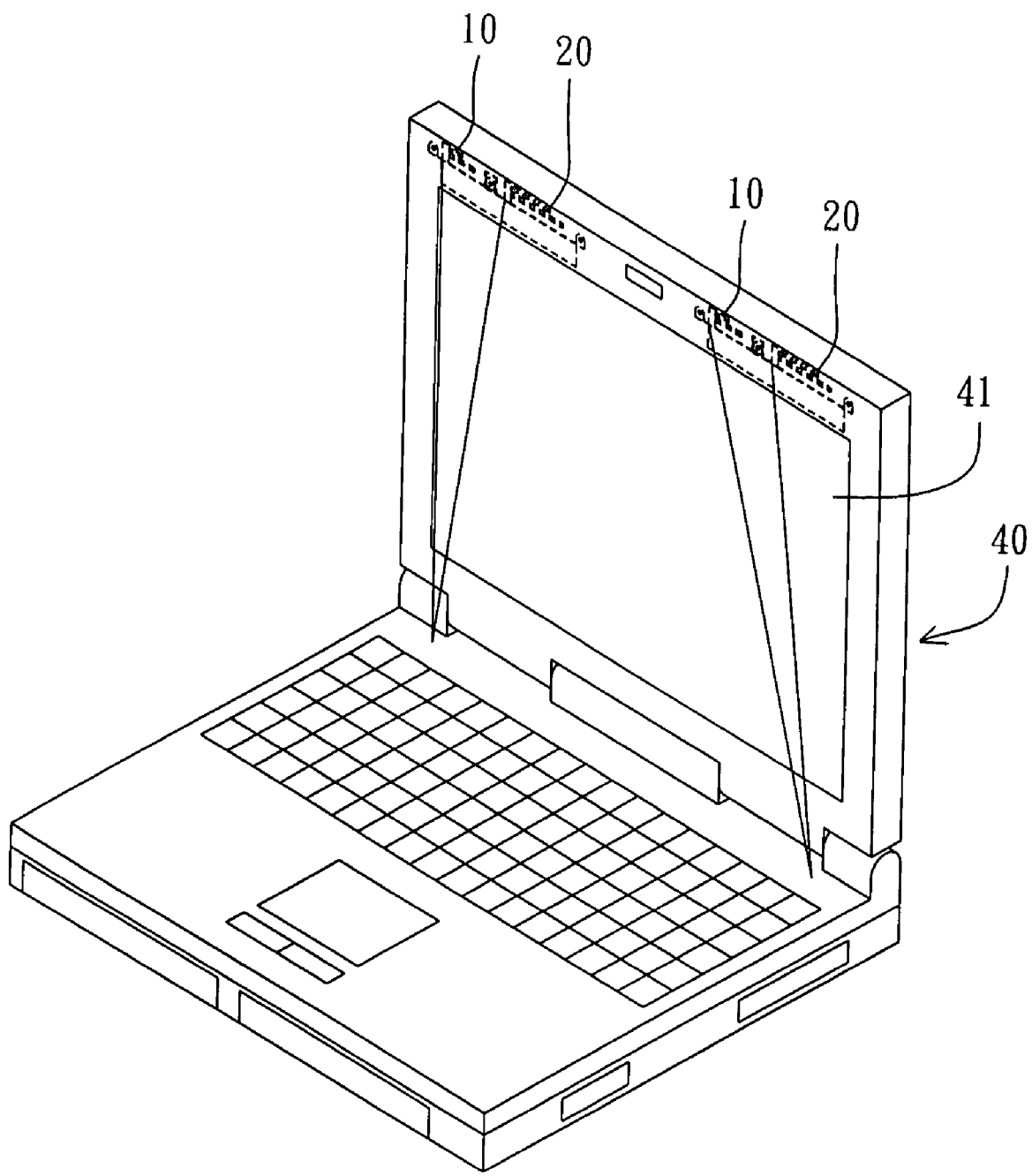
FIG. 3 is a schematic diagram showing the modulized antenna structure of the present invention that had been installed on an electronic device.

FIG. 3 is a schematic diagram showing the modulized antenna structure of the present invention that had been installed on an electronic device. As shown in the drawing, after the first antenna module 10 is overlapped with the second antenna module 20 in the present embodiment, the first and second antenna modules 10 and 20 can be fixed on the top left and/or top right of the screen of the electronic device 40 by using the fixed component 30.

If the second antenna module 20 is a DVB antenna module or a GPS antenna module, since the receiving sensitivity of the Wi-Fi wireless signal is higher (for example, but not limited to −85 dBm), the first antenna module 10 for receiving the Wi-Fi wireless signal is disposed close to the external side of the screen 41 of the electronic device. The receiving sensitivity of the DVB or GPS wireless signal is lower (for example, but not limited to −80 dBm), thus it is disposed on the internal side, such that the electronic device 40 can maintain a good signal receiving state. On the other hand, when the second antenna module 20 is a 3G antenna module, the first antenna module 10 for receiving the Wi-Fi wireless signal is disposed on the internal side of the modulized antenna structure, and the second antenna module 20 for receiving the 3G wireless signal is disposed on the external side, such that the second antenna module 20 can easily receive the 3G wireless signal that has the highest receiving sensitivity (for example, but not limited to −100 dBm). Therefore, by applying the aforementioned modulized antenna structure, the electronic device 40 effectively receives the Wi-Fi wireless signal, the DVB wireless signal, the GPS wireless signal or the 3G wireless signal. In addition, the antenna structure is easily assembled, the manufacturing cost is reduced, and the desired antenna modules can be flexibly configured based on the product's requirements. Accordingly, the present invention effectively resolves the disadvantages of the conventional multi-frequency antenna structure.

Figure 4:
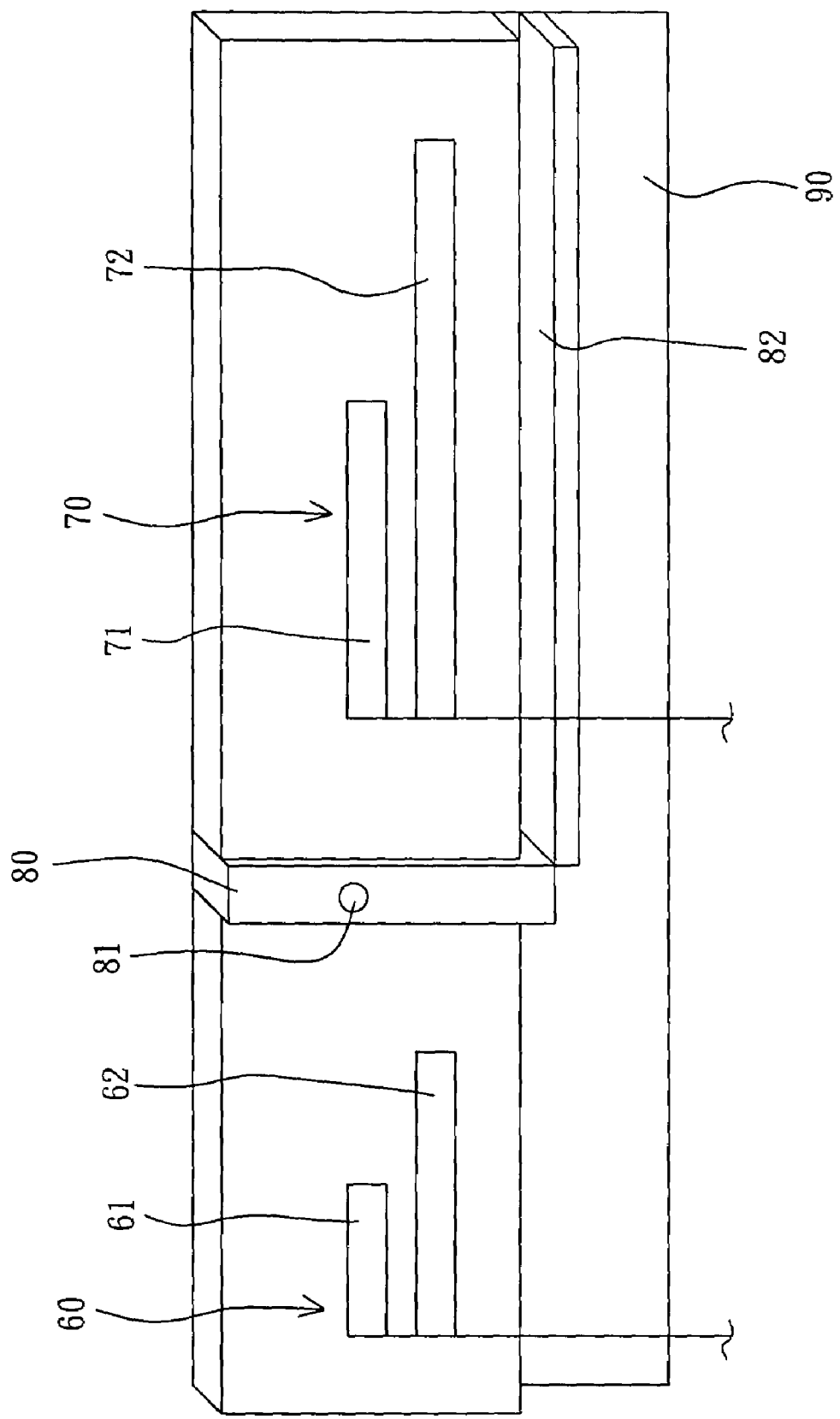
FIG. 4 is a schematic diagram showing a modulized antenna structure according to another preferred embodiment of the present invention.

FIG. 4 is a schematic diagram showing a modulized antenna structure according to another preferred embodiment of the present invention. As shown in the drawing, the modulized antenna structure of the present invention comprises a first antenna module 60 and a second antenna module 70.

Wherein, the first antenna module 60 may for example be a Wi-Fi antenna module for receiving a first transmission signal, which may for example be a Wi-Fi wireless signal, but it is not limited to them.

The first antenna module 60 further comprises a first antenna 62 and a second antenna 63. Wherein, the first antenna 62 is shorter than the second antenna 63 and disposed in front of the second antenna 63. The first antenna 62 for example may transmit or receive a 5 GHz wireless signal, but it is not limited to it. The second antenna 63 for example may transmit or receive a 2.4 GHz wireless signal, but it is not limited to it.

The second antenna module 70 may for example be a DVB antenna module, a GPS antenna module or a 3G antenna module for receiving a second transmission signal, which may for example be a DVB, a GPS or a 3G wireless signal, but it is not limited to them.

The second antenna module 70 further comprises a first antenna 72 and a second antenna 73. Wherein, the first antenna 72 is shorter than the second antenna 73 and disposed in front of the second antenna 73. The first antenna 72 for example may transmit or receive an 1800~2170 MHz Wi-Fi wireless signal, but it is not limited to it. The second antenna 73 for example may transmit or receive an 800~1000 MHz Wi-Fi wireless signal, but it is not limited to it.

In addition, the first antenna module 60 is partially overlapped with the second antenna module 70 to form a protruding wall 80, here the wall 80 may for example be a grounded wall with a width of less than 1 cm, but it is not limited to it. Wherein, the grounded wall 80 further comprises a fixed hole 81 for a fixed component 30 to pass through and fix thereon. The grounded wall 80 can provide the grounded function, and the modulized antenna structure of the present invention can be fixed on the screen 41 of the electronic device 40 by using the fixed component 30.

In addition, the modulized antenna structure of the present invention further comprises a metal wall 82, which is disposed below the second antenna module 70 and one end of the metal wall 82 is coupled to the grounded wall 80 for covering the second antenna module 70, such that the interference generated between the first antenna module 60 and the second antenna module 70 is avoided.

In addition, the modulized antenna structure of the present invention further comprises a grounded metal stick board 90, on which one surface is respectively coupled to the first antenna module 60 and the second antenna module 70 in order to improve the grounded function, and another surface is affixed on the electronic device 40, so as to enhance the fixed effectiveness of the first antenna module 60 and the second antenna module 70. Wherein, the first antenna module 60, the second antenna module 70, the grounded wall 80, the metal wall 82, and the grounded metal stick board 90 are integrated as one single piece to save the manufacturing and assembly cost.

Figure 5:
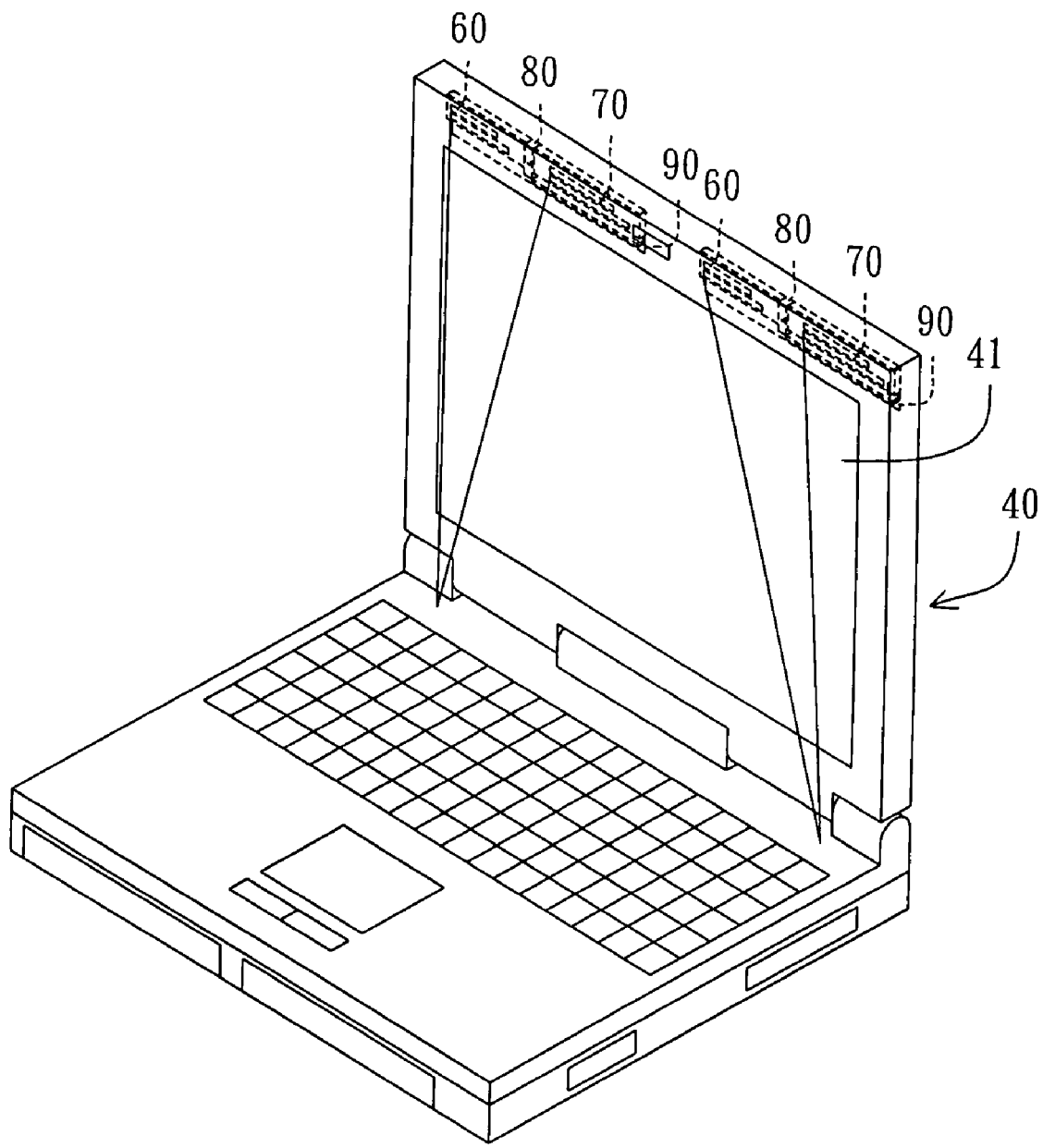
FIG. 5 is a schematic diagram showing the modulized antenna structure of the present invention that had been installed on an electronic device.

FIG. 5 is a schematic diagram showing the modulized antenna structure of the present invention that had been installed on an electronic device. As shown in the drawing, while being assembled, the fixed component 30 is passed through the fixed hole 81 of the grounded wall 80 and fixed on the top left and/or top right of the screen 41 of the electronic device 40. Afterwards, the grounded metal stick board 90 is affixed on the screen 41 of the electronic device 40 so as to complete the assembly of the modulized antenna structure of the present embodiment.

If the second antenna module 70 is a DVB antenna module or a GPS antenna module, since the receiving sensitivity of the Wi-Fi wireless signal is higher (for example, but not limited to −85 dBm), the first antenna module 60 for receiving the Wi-Fi wireless signal is disposed close to the external side of the screen 41 of the electronic device. The receiving sensitivity of the DVB or GPS wireless signal is lower (for example, but not limited to −80 dBm), thus it is disposed on the internal side, such that the electronic device 40 can maintain a good signal receiving state. On the other hand, when the second antenna module 70 is a 3G antenna module, the first antenna module 60 for receiving the Wi-Fi wireless signal is disposed on the internal side of the modulized antenna structure, and the second antenna module 70 for receiving the 3G wireless signal is disposed on the external side, such that the second antenna module 70 can easily receive the 3G wireless signal that has the highest receiving sensitivity (for example, but not limited to −100 dBm). Therefore, by applying the aforementioned modulized antenna structure, the electronic device 40 effectively receives the Wi-Fi wireless signal, the DVB wireless signal, the GPS wireless signal or the 3G wireless signal. In addition, the antenna structure is easily assembled, the manufacturing cost is reduced, and the desired antenna modules can be flexibly configured based on the product's requirements. Accordingly, the present invention effectively resolves the disadvantages of the conventional multi-frequency antenna structure.

Figure 6:
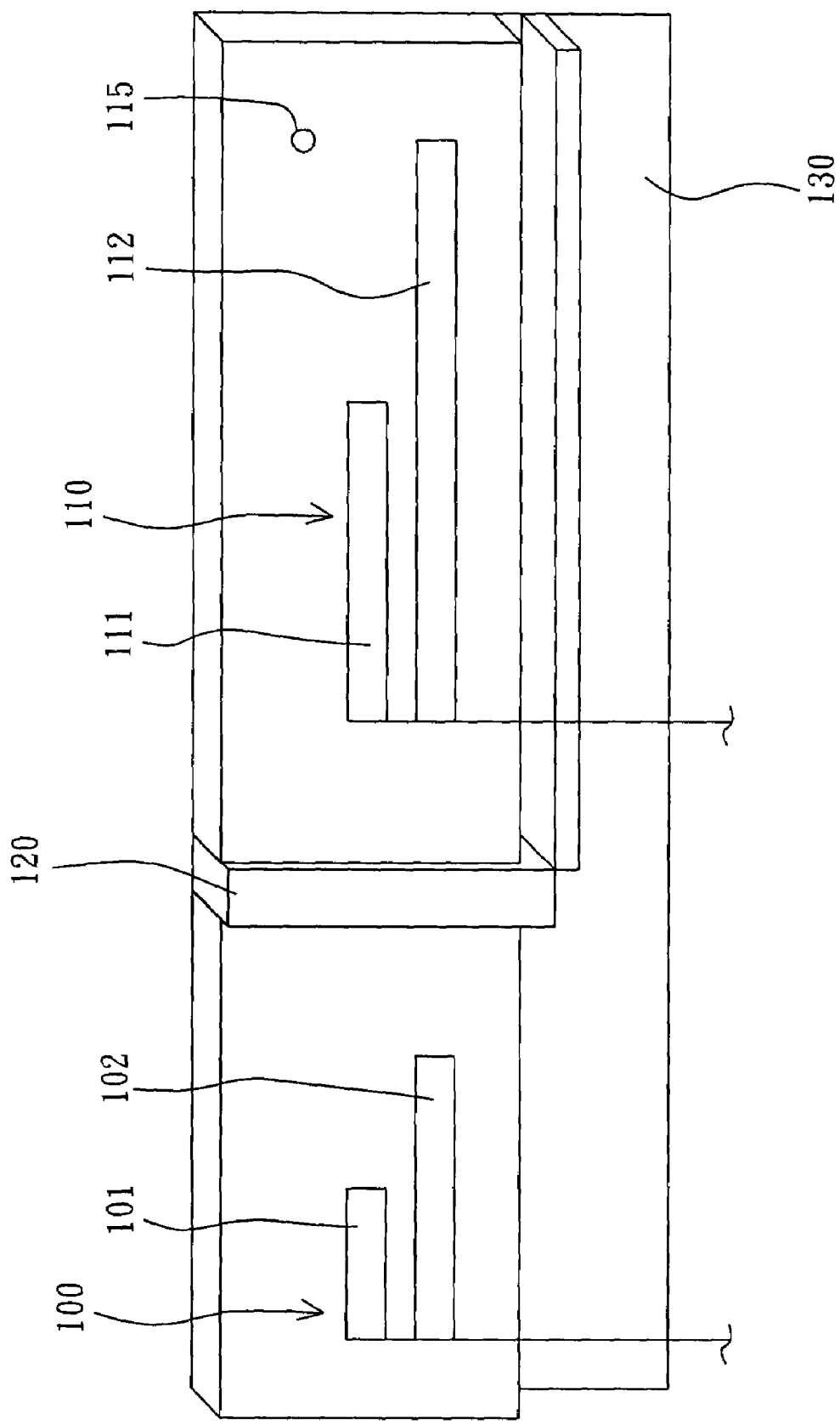
FIG. 6 is a schematic diagram showing a modulized antenna structure according to yet another preferred embodiment of the present invention.

FIG. 6 is a schematic diagram showing a modulized antenna structure according to yet another preferred embodiment of the present invention. As shown in the drawing, the modulized antenna structure of the present invention comprises a first antenna module 100, a second antenna module 110, and a grounded metal wall 120.

Wherein, the first antenna module 100 may for example be a Wi-Fi antenna module for receiving a first transmission signal, which may for example be a Wi-Fi wireless signal, but it is not limited to them.

The first antenna module 100 further comprises a first antenna 101 and a second antenna 102. Wherein, the first antenna 101 is shorter than the second antenna 102 and disposed in front of the second antenna 102. The first antenna 101 for example may transmit or receive a 5 GHz wireless signal, but it is not limited to it. The second antenna 102 for example may transmit or receive a 2.4 GHz wireless signal, but it is not limited to it.

The second antenna module 110 may for example be a DVB antenna module, a GPS antenna module or a 3G antenna module for receiving a second transmission signal, which may for example be a DVB, a GPS or a 3G wireless signal, but it is not limited to them.

The second antenna module 110 further comprises a first antenna 111 and a second antenna 112. Wherein, the first antenna 111 is shorter than the second antenna 112 and disposed in front of the second antenna 112. The first antenna 111 for example may transmit or receive an 1800~2170 MHz Wi-Fi wireless signal, but it is not limited to it. The second antenna 112 for example may transmit or receive an 800~1000 MHz Wi-Fi wireless signal, but it is not limited to it.

The grounded metal wall 120 is built in the shape of the letter "L", in which a vertical side is disposed between the first antenna module 100 and the second antenna module 110 in order to provide a grounded function, and a horizontal side is disposed below the second antenna module 110 to block the first antenna module 100 and the second antenna module 110, such that the mutual interference between the Wi-Fi wireless signal and the DVB, the GPS or the 3G wireless signal is avoided.

In addition, the second antenna module 110 of the present invention further comprises a fixed hole 115 for a fixed component 30 to pass through, such that the modulized antenna structure is fixed on the screen 41 of the portable device 40.

Additionally, the modulized antenna structure of the present invention further comprises a grounded metal stick board 130, on which one surface is respectively coupled to the first antenna module 100 and the second antenna module 110 in order to provide the grounded function, and another surface is affixed on the electronic device, so as to enhance the fixed effectiveness of the first antenna module 100 and the second antenna module 110.

Therefore, by applying the modulized antenna structure of the present invention, in which the desired antenna modules and the antenna's position can be flexibly configured on the modulized antenna structure based on the product's requirements. In addition, the present invention effectively constraints the position of the antenna module to improve the antenna's receiving effectiveness and facilitate the antenna's assembly, so as to reduce the manufacturing cost. Accordingly, the present invention effectively resolves the disadvantages of the conventional multi-frequency antenna structure.

Although the invention has been described with reference to a particular embodiment thereof, it will be apparent to one of the ordinary skills in the art that modifications to the described embodiment may be made without departing from the spirit of the invention. Accordingly, the scope of the invention will be defined by the attached claims not by the above detailed description.

What is claimed is:

1. A modulized antenna structure, comprising:
   a first antenna module with a first signal receiving sensitivity for receiving a first transmission signal, wherein at least one side of said first antenna module has a first opening;
   a second antenna module with a second signal receiving sensitivity for receiving a second transmission signal, wherein at least one side of said second antenna module has a second opening and said first signal receiving sensitivity is lower than said second signal receiving sensitivity; and
   a fixed component;
   wherein, while being assembled, said first antenna module is partially overlapped with said second antenna module and said first opening is fully overlapped with said second opening, then said fixed component is passed through said first opening and said second opening and fixed on an electronic device.

2. The modulized antenna module of claim 1, wherein said first antenna module is a wireless local area network Wi-Fi antenna module, said second antenna module is a 3G antenna module, and said second antenna module is disposed closer to one side of a screen of said electronic device than said first antenna module, such that said electronic device can maintain a good signal receiving state.

3. The modulized antenna module of claim 2, wherein said first antenna module further comprises a first antenna and a second antenna, in which said first antenna is shorter than said second antenna and disposed in front of said second antenna for transmitting or receiving a 5 GHz wireless signal, and said second antenna is for transmitting or receiving a 2.4 GHz wireless signal.

4. The modulized antenna module of claim 2, wherein said second antenna module further comprises a first antenna and a second antenna, in which said first antenna is shorter than said second antenna and disposed in front of said second antenna for transmitting or receiving an 1800~2170 MHz wireless signal, and said second antenna is for transmitting or receiving an 800~1000 MHz wireless signal.

5. The modulized antenna module of claim 1, wherein said first antenna module is a DVB antenna module or a GPS antenna module, said second antenna module is a wireless local area network Wi-Fi antenna module, and said second antenna module is disposed closer to one side of a screen of said electronic device than said first antenna module, such that said electronic device can maintain a good signal receiving state.

6. The modulized antenna module of claim 1, wherein an overlapped portion of said first antenna module and said second antenna module is less than 1 cm.

7. The modulized antenna module of claim 6, further comprising a grounded wall and a metal wall, wherein said grounded wall is disposed on said overlapped first opening and said second opening to provide a grounded function, whereas said metal wall is disposed below said second antenna module and one end of said metal wall is coupled to said grounded wall for covering said second antenna module to prevent the interference from being generated between said first antenna module and said second antenna module.

8. The modulized antenna module of claim 1, wherein said fixed component is a screw, a bolt or a pin.

9. The modulized antenna module of claim 1, further comprising a grounded metal stick board, on which one surface is respectively coupled to said first antenna module and said second antenna module to provide said grounded function, and another surface is affixed on said electronic device to enhance the fixed effectiveness of said first antenna module and said second antenna module.

10. A modulized antenna structure, comprising:
    a first antenna module with a first signal receiving sensitivity for receiving a first transmission signal; and
    a second antenna module with a second signal receiving sensitivity for receiving a second transmission signal, wherein said first signal receiving sensitivity is lower than said second signal receiving sensitivity, said first antenna module is partially overlapped with said second antenna module to form a protruding wall, and said wall comprises a fixed hole for a fixed component to pass through and fix thereon, such that while being assembled, said partially overlapped first antenna module and said second antenna module can be fixed on an electronic device.

11. The modulized antenna module of claim 10, wherein said first antenna module is a wireless local area network Wi-Fi antenna module, said second antenna module is a 3G antenna module, and said second antenna module is disposed closer to one side of a screen of said electronic device than said first antenna module, such that said electronic device can maintain a good signal receiving state.

12. The modulized antenna module of claim 11, wherein said first antenna module further comprises a first antenna and a second antenna, in which said first antenna is shorter than said second antenna and disposed in front of said second antenna for transmitting or receiving a 5 GHz wireless signal, and said second antenna is for transmitting or receiving a 2.4 GHz wireless signal.

13. The modulized antenna module of claim 11, wherein said second antenna module further comprises a first antenna and a second antenna, in which said first antenna is shorter than said second antenna and disposed in front of said second antenna for transmitting or receiving an 1800~2170 MHz wireless signal, and said second antenna is for transmitting or receiving an 800~1000 MHz wireless signal.

14. The modulized antenna module of claim 10, wherein said first antenna module is a DVB antenna module or a GPS antenna module, said second antenna module is a wireless local area network Wi-Fi antenna module, and said second antenna module is disposed closer to one side of a screen of said electronic device than said first antenna module, such that said electronic device can maintain a good signal receiving state.

15. The modulized antenna module of claim 10, wherein said wall is a grounded wall with a width of less than 1 cm.

16. The modulized antenna module of claim 15, further comprising a metal wall, which is disposed below said second antenna module and one end of said metal wall is coupled to said grounded wall for covering said second antenna module to prevent the interference from being generated between said first antenna module and said second antenna module.

17. The modulized antenna module of claim 10, wherein said fixed component is a screw, a bolt or a pin.

18. The modulized antenna module of claim 10, wherein said electronic device is a notebook computer, a PDA or an intelligent mobile phone.

19. The modulized antenna module of claim 10, further comprising a grounded metal stick board, on which one surface is respectively coupled to said first antenna module and said second antenna module to provide said grounded function, and another surface is affixed on said electronic device to enhance the fixed effectiveness of said first antenna module and said second antenna module.

20. The modulized antenna module of claim 10, wherein said first antenna module and said second antenna module are integrated as one single piece.

21. A modulized antenna structure, comprising:
a first antenna module with a first signal receiving sensitivity for receiving a first transmission signal;
a second antenna module with a second signal receiving sensitivity for receiving a second transmission signal, wherein said first signal receiving sensitivity is lower than said second signal receiving sensitivity;
a grounded metal wall disposed between said first antenna module and said second antenna module, wherein while being assembled, said first antenna module, said grounded metal wall, and said second antenna module are fixed on an electronic device; and
said second antenna module further comprises a fixed hole for a fixed component to pass through and fix thereon, such that said modulized antenna module can be fixed on said screen of said portable device.

22. The modulized antenna module of claim 21, wherein said first antenna module is a wireless local area network Wi-Fi antenna module, said second antenna module is a 3G antenna module, and said second antenna module is disposed closer to one side of a screen of said electronic device than said first antenna module, such that said electronic device can maintain a good signal receiving state.

23. The modulized antenna module of claim 22, wherein said first antenna module further comprises a first antenna and a second antenna, in which said first antenna is shorter than said second antenna and disposed in front of said second antenna for transmitting or receiving a 5 GHz wireless signal, and said second antenna is for transmitting or receiving a 2.4 GHz wireless signal.

24. The modulized antenna module of claim 22, wherein said second antenna module further comprises a first antenna and a second antenna, in which said first antenna is shorter than said second antenna and disposed in front of said second antenna for transmitting or receiving an 1800~2170 MHz wireless signal, and said second antenna is for transmitting or receiving an 800~1000 MHz wireless signal.

25. The modulized antenna module of claim 22, wherein said first antenna module is a DVB antenna module or a GPS antenna module, said second antenna module is a wireless local area network Wi-Fi antenna module, and said second antenna module is disposed closer to said side of said screen of said electronic device than said first antenna module, such that said electronic device can maintain a good signal receiving state.

26. The modulized antenna module of claim 21, wherein said grounded metal wall is built in the shape of the letter "L", in which a vertical side is disposed between said first antenna module and said second antenna module to provide said grounded function, and a horizontal side is disposed below said second antenna module to block said first antenna module and said second antenna module.

27. The modulized antenna module of claim 21, further comprising a grounded metal stick board, on which one surface is respectively coupled to said first antenna module and said second antenna module to provide said grounded function, and another surface is affixed on said electronic device to enhance the fixed effectiveness of said first antenna module and said second antenna module.

* * * * *